(No Model.)
R. J. BOLE.
INSERTIBLE SAW TOOTH.
No. 420,857. Patented Feb. 4, 1890.
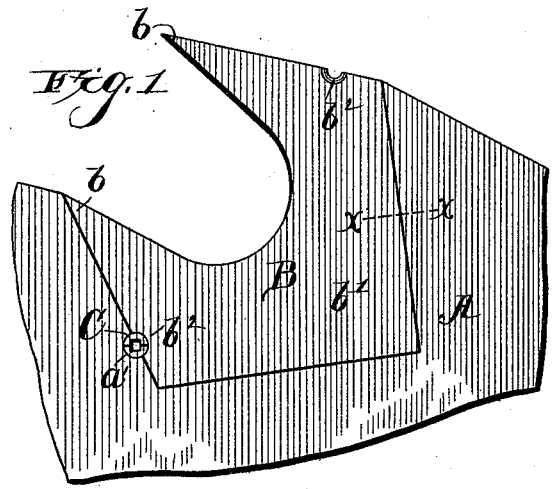
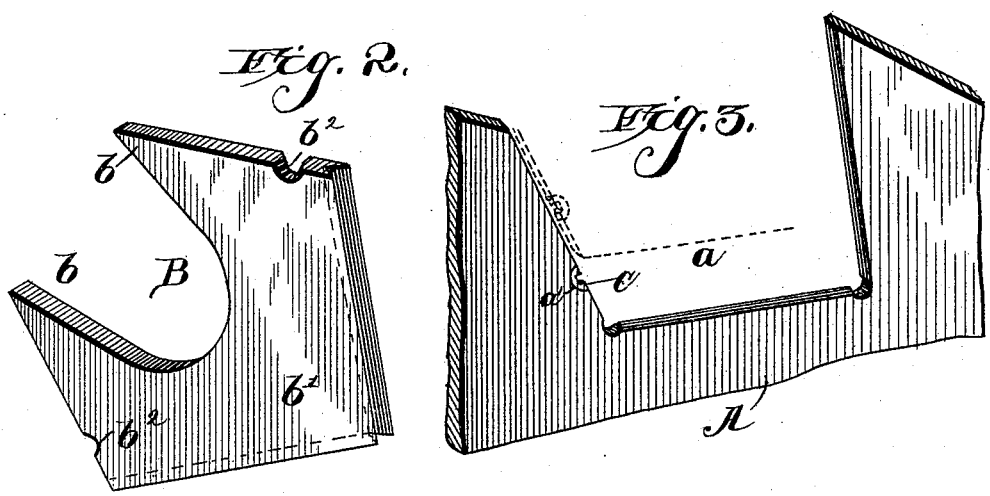
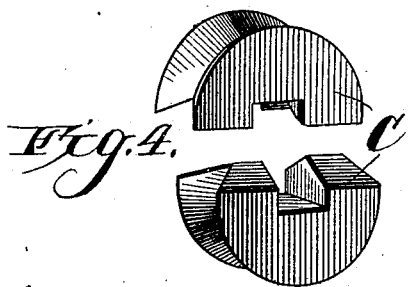
Witnesses
Henry J. Dieterich
H. F. Riley
Inventor
Robert J. Bole,
By his Attorneys

UNITED STATES PATENT OFFICE.

ROBERT JOHN BOLE, OF BEAVER FALLS, PENNSYLVANIA.

INSERTIBLE SAW-TOOTH.

SPECIFICATION forming part of Letters Patent No. 420,857, dated February 4, 1890.

Application filed November 13, 1888. Serial No. 290,693. (No model.)

*To all whom it may concern:*

Be it known that I, ROBERT JOHN BOLE, a citizen of the United States, residing at Beaver Falls, in the county of Beaver and State of Pennsylvania, have invented a new and useful Improvement in Insertible Saw-Teeth, of which the following is a specification.

The invention relates to improvements in insertible saw-teeth.

Heretofore great difficulty has been experienced in retaining reversible teeth in the body of the saw, which is provided with recesses adapted for their reception, such recesses being generally constructed with curved sides, and being more or less open, thereby rendering the teeth extremely liable to become displaced.

The object of the present invention is to obviate this difficulty and provide an insertible reversible saw-tooth of simple and uncomplicated construction, capable of being securely retained in the body or blade.

Furthermore, the object of the invention is to provide a key for locking the tooth in the body or blade that will completely fill up the recess occupied by it, and thereby greatly lessen the possibility of the tooth loosening or flying out while in operation.

The invention consists in the novel combination and arrangement of the parts hereinafter fully described, illustrated in the accompanying drawings, and pointed out in the claims hereto appended.

In the accompanying drawings, forming part of this specification, and in which like letters of reference designate corresponding parts—

Figure 1 is a side view of a portion of a saw body or blade, illustrating the manner of securing the teeth. Fig. 2 is a detail perspective view of one of the teeth. Fig. 3 is a detail view of the body or blade, showing the angular tooth-notch with the tooth partially in dotted lines and in the act of being withdrawn. Fig. 4 is a detail perspective view of the key employed in locking the saw-teeth in the body or blade, showing the two parts of the key separated. Fig. 5 is a transverse section on the line $x \, x$, Fig. 1. Fig. 6 is a transverse section through the locking-key.

Referring to the accompanying drawings, A designates a saw body or blade provided along its edge or periphery with tooth notches or recesses $a$, which are angular and inclose and hold insertible saw-teeth B upon three sides, whereby large bearing-surfaces are presented to the saw-teeth, which are thereby securely retained in the recesses $a$ of the body or blade A and form an unbroken surface where they join the latter. The corners of the angular recesses are drilled or filed, whereby the metal is prevented from splitting or cracking. These angular recesses have their edges on the sides that are adjacent to the rear of the saw-teeth B made V-shaped in section, in order to form guides and retainers for the insertible saw-teeth.

The insertible saw-teeth B are formed with two cutting portions $b \, b$, integral with an angular back or end portion $b'$, which conforms in outline with the recesses $a$, and has its edges V-grooved to fit the sides of the recesses $a$ and ride over them. By this construction a reversible saw-tooth is produced, which has a square seat in the saw, and is not only detachable to provide against wear and breakage, but combines two teeth in one, capable of alternate or successive use, as occasion requires, thereby materially increasing the economy and durability of the saw and eliminating many inconveniences attendant upon those insertible saw-teeth having curved or partially-curved sides; nor is the blade weakened or in anywise injured by any deep entry of the insertible saw-tooth within it, and much metal is thereby saved.

In order to lock the saw-teeth B in the body or flange A of the saw, one side of the recess is provided with a semicircular notch $a'$, having its edge V-shaped in cross-section, while the outside of each cutting portion $b$ is provided with a similar notch $b^2$, one or the other of which notches $b^2$ align with the notch $a'$ when the saw-tooth B is fitted in the recess $a$, and forms an opening for the reception of a key C. The key C consists of a circular plate, which entirely fills the opening formed by the notches $a'$ and $b^2$, and prevents the key from becoming loose, which would not be the case were the key constructed arc-shaped, as heretofore, and the circular key-plate C is composed of two pieces, one portion conforming to the configuration of one of the notches and the other portion conforming to the other notch. I generally prefer to divide the circular key-plate in half, making the division-line along one of its diameters, and the meeting edges are made V-shaped, one riding the other. The periphery of the circular key-plate C is also provided with a V-shaped groove, which rides over the V-shaped edges of the notch $a'$ and $b^2$. I may prefer to construct the circular key-plate and the division at some other point, it of course being understood that I do not limit myself to the precise details of construction herein shown and described, as I may, without departing from the spirit of the invention, make any minor changes therein.

Preparatory to putting the saw-tooth in place in the recess $a$ one portion of the circular plate or key C is placed in the notch $a'$ in the side of the recess $a$, and the other portion of the key C is put in the notch $b^2$ in the side of the saw-tooth. Then the saw-tooth is fitted in the recess. To lock the saw-tooth in place, the diametrical meeting edges of the two portions of the key C are turned out of line with the edge of the recess $a$ by inserting a suitable instrument in a square or angular hole in the circular key-plate, and to unlock the saw-tooth for the purpose of removing the same the diametrical meeting edges are made to align with the side of the recess, when the saw-tooth may be withdrawn.

From the foregoing description and the accompanying drawings the construction, operation, and advantages of the invention will readily be understood, and it will clearly be seen that saws constructed in accordance with this invention have their saw-teeth securely retained therein, and are provided with locking-keys that prevent the accumulation of sawdust around them, and they greatly lessen the possibility of working loose or flying out while in operation or tightening the rim of the saw, as the key does not bind when turned.

Having described my invention, I claim—

1. The combination of a saw body or blade provided with an angular tooth-notch, and an insertible saw-tooth consisting of two cutting portions united together by an angular back or end portion, said tooth conforming to the configuration of said notch and entirely filling the same, substantially as and for the purpose described.

2. In a saw, a circular key-plate composed of two portions adapted to fill the entire space of the opening occupied by it and capable of being turned to bring the meeting edges of the two portions in and out of line with the meeting edges of an insertible saw-tooth, and a saw body or blade, substantially as and for the purpose described.

3. The combination of a saw body or blade provided with an angular tooth-notch having on one of its sides a curved notch, an insertible saw-tooth consisting of two cutting portions provided with curved notches and united by an angular block or end portion, and a circular key adapted to fill the entire opening from the curved notch of the saw and one of those of the cutting portions, the circular key-plate being composed of two pieces, substantially as and for the purpose described.

4. The combination of a saw body or blade provided with an angular tooth-notch and having on one of the sides of the angular notch a curved notch, an insertible saw-tooth consisting of two cutting portions provided with curved notches and united by an angular back or end portion, and a circular key-plate composed of two semicircular pieces, the diametrical meeting edges being V-shaped, one riding the other, substantially as described.

5. The combination of a saw body or blade provided with an angular tooth-notch and having on one of the sides of the angular notch a curved notch, an insertible saw-tooth consisting of two cutting portions provided with curved notches and united by an angular back or end portion, and a circular key-plate composed of two pieces having V-shaped meeting edges and angular opening for the insertion of a suitable instrument to turn the circular key-plate, substantially as described.

In testimony that I claim the foregoing as my own I have hereto affixed my signature in presence of two witnesses.

ROBERT JOHN BOLE.

Witnesses:
S. S. CORNELIUS,
JAMES PIPER.